(12) United States Patent
Baisch

(10) Patent No.: US 6,648,256 B1
(45) Date of Patent: Nov. 18, 2003

(54) INTEGRATED STRIKE BUTTON

(75) Inventor: Eric K. Baisch, Philadelphia, PA (US)

(73) Assignee: Penn Fishing Tackle Manufacturing Co., Philadelphia, PA (US)

( * ) Notice: Subject to any disclaimer, the term of this patent is extended or adjusted under 35 U.S.C. 154(b) by 0 days.

(21) Appl. No.: 10/174,897

(22) Filed: Jun. 20, 2002

(51) Int. Cl.[7] .................................................. A01K 89/02
(52) U.S. Cl. ......................................... 242/245; 242/260
(58) Field of Search ................................. 242/244, 265, 242/270, 266, 260, 245, 243

(56) References Cited

U.S. PATENT DOCUMENTS

| | | | | |
|---|---|---|---|---|
| 3,000,477 A | * | 9/1961 | Dunn | 242/270 |
| 3,416,746 A | * | 12/1968 | Hull | 242/244 |
| 3,425,644 A | * | 2/1969 | Griste | 242/270 |
| 3,521,830 A | * | 7/1970 | Hull | 242/311 |
| 4,067,512 A | * | 1/1978 | Nepote | 242/270 |
| 5,297,756 A | * | 3/1994 | Ikuta | 242/270 |
| 5,556,050 A | * | 9/1996 | Baisch et al. | 242/296 |
| 6,039,279 A | * | 3/2000 | Datcuk et al. | 242/296 |
| 6,045,073 A | * | 4/2000 | Ikuta | 242/260 |
| 6,152,390 A | * | 11/2000 | Datcuk, Jr. | 242/270 |

* cited by examiner

*Primary Examiner*—Emmanuel M Marcelo
(74) *Attorney, Agent, or Firm*—Frank J. Benasutti

(57) ABSTRACT

A lever drag fishing reel having multiple drag positions, including a strike position and a full drag position has a one-piece button spring assembly means for permitting the lever to advance from the strike position to the full drag position. The one-piece button spring assembly means comprising a button integrally joined with a spring and integrally joined with a bracket fixedly mounted to the reel.

6 Claims, 2 Drawing Sheets

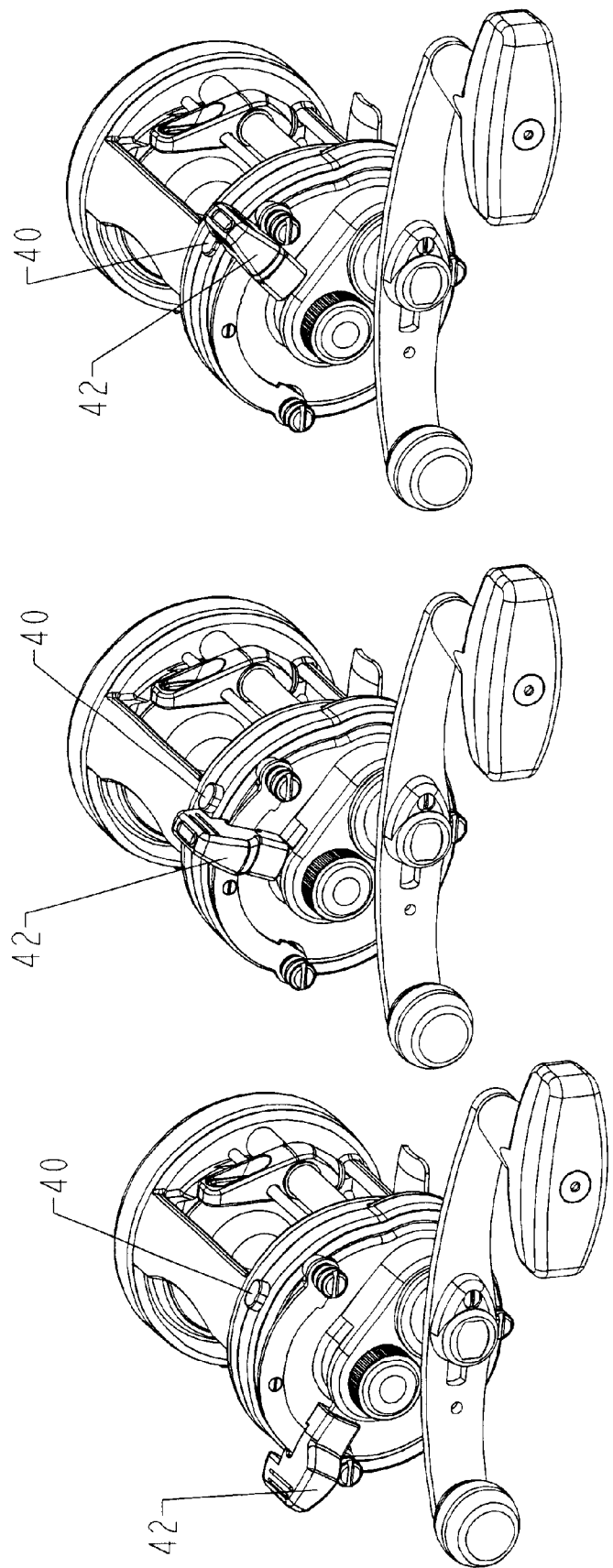

INTEGRATED STRIKE BUTTON

BACKGROUND OF THE INVENTION

1. Technical Field

This invention relates to lever drag reels and, more particularly, to strike buttons for lever drag reels.

2. Description of the Art

In the prior art, it was known to have lever drag controls on large deep sea sport fishing reels. More recently, lever drag controls have been used on smaller reels, such as bait casting reels.

Because of the size and configuration of the smaller reels, it is difficult to place on them all of the sophisticated features that are found in larger reels.

The prior art lever drag system normally has free spool, strike, and full drag positions. Working as a complement to the pre-set drag system is a lever drag control. Basically, the higher the fisherman pushes the lever, the more drag pressure it adds; just like pushing a brake pedal down on a car. In the active sport of fishing, it is desirable to throw the drag lever from the free spool to the strike drag position and have it stop in that position. In larger reels, this stop is accomplished by a stop button, such as that shown in the exploded prior art view, FIG. 4.

That is the position of the pre-set strike setting. This setting is where the fisherman measures the preset drag and where the fisherman will strike and fight the fish. The button provides a secure, positive stop, so that the fisherman can instantly advance the lever to the strike and fight the fish with confidence.

Under certain conditions, the fisherman wishes to advance the drag lever to the full drag position. To do so, the fisherman must first depress the strike button so that the lever can override the button. This also serves as a reminder to the fisherman to use the full position with caution.

A typical prior art button is shown in FIG. 4 and comprises a button 10 positioned to slide axially in the housing 12. The housing is positioned and retained in a hole in the wall of the frame 14 of the fishing reel by any suitable means. The button 10 is retained in the housing by any suitable means such as a spring clip 16 engaging a groove 18 in a portion of the button. A spring 20 is retained in housing about the protrusion 17 on the button and engaging the shoulder 21 of the button so that when the button is pushed in against the force of the spring, it will also be forced normally outwardly.

Problems arise when trying to make such an arrangement compatible with the size of the smaller frames of the lever drag reels.

It is an object of this invention to overcome those problems and, in addition, to make a much simpler design to achieve the desirable results.

DISCLOSURE OF THE INVENTION

Summary of the Invention

This invention comprises an improved, small, one-piece button spring assembly means for use with small lever drag fishing reels.

In particular, I have invented an improvement in a lever drag fishing reel having multiple drag positions; said improvement comprising a one-piece button spring assembly means for permitting a lever to advance from a first strike position to a second position, said one-piece button spring assembly means further comprising a button integrally joined with a spring and a bracket fixedly mounted to the reel.

The one-piece button spring assembly means further comprises an oblong button, a spring in the shape of an elliptical loop of non-round cross-section, connected to the button at two points; and a boss means attached to said reel to limit movement of the spring when it is being compressed.

BRIEF DESCRIPTION OF DRAWINGS

FIG. 1 shows a perspective view of a lever drag reel in accordance with the present invention; shown in the free spool position;

FIG. 2 shows a perspective view of a lever drag reel in accordance with the present invention; in the strike position;

FIG. 3 shows a perspective view of a lever drag reel in accordance with the present invention; in the full drag position;

DESCRIPTION OF THE PREFERRED EMBODIMENTS

Figure 4:
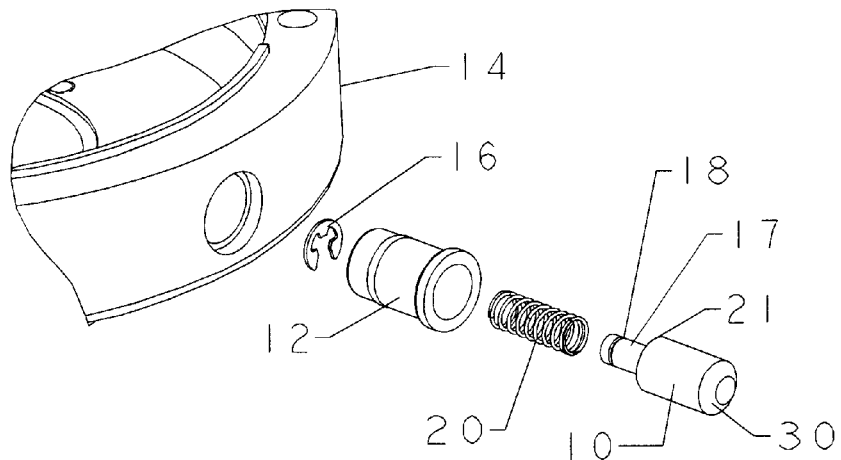
FIG. 4 is a perspective, partially exploded view of a portion of a prior art fishing reel.

In the reel shown in the prior art, FIG. 4, the frame 14 is large enough to accommodate a button 10 having a sufficient surface area (designated generally 30) to make it easy for the fisherman to press the button when needed.

In the reel, that frame is insufficiently large to provide enough peripheral surface area to house a button of the type described in the prior art, i.e., one with sufficient surface area to be used by a fisherman.

I have provided a new button and spring means as more particularly shown in FIGS. 5 through 9.

In accordance with my invention, the button 40 portion of this means is oblong in cross-section so that the button provides enough surface area to allow the fisherman to press the button, while at the time advancing the lever 42, FIG. 2, from that position to the position of full drag shown in FIG. 3. This button is on a relatively narrow peripheral surface of the frame of the lever drag reel.

Figure 7:
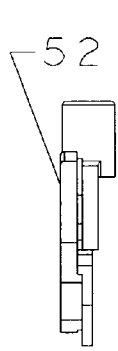
FIG. 7 is a left side elevation of the device shown in FIG. 6.
Figure 6:
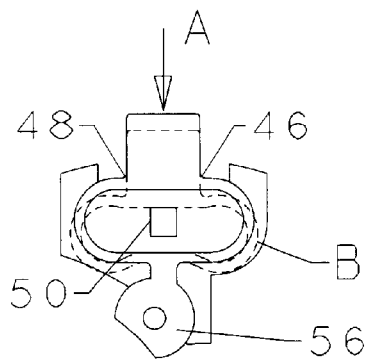
FIG. 6 is a plan view of a button and spring arrangement as shown in FIG. 5.
Figure 5:
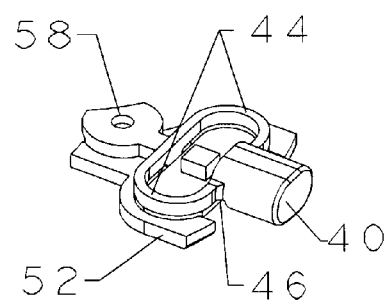
FIG. 5 is a perspective view of a unified, small button and spring arrangement in accordance with my invention.

The button and spring means, as shown more particularly in FIGS. 5 through 7, also includes a plastic spring 44, most preferably in an oblong or elliptical shape of relatively thin cross-section. This part is molded in unison with the button 40 and is attached thereto at points 46 and 48. Because of the nature of the plastic material and its thin construction, it can be depressed inwardly in the direction of the arrow A in FIG. 6, so as to compress it to a small amount of deflection, as shown by the phantom line position B. The maximum deflection can be controlled by the upstanding boss 50, which rises from the housing 52.

By varying the size of the loop or elliptical member 44, the strength of the spring can be varied—the greater the length, the more pliant the spring; the shorter the length, the stiffer the spring. Those of skill in the art will adjust this length to meet the physical parameters of the inside of the case of the reel for housing of the spring and the desired parameters for pushing the button down to allow the lever 42 to pass over the button 40. In this most preferred embodiment, I show an elliptical member which has a rectangular cross-sectional area.

At the bottom of the loop or spring member 44, there is a brace 56, which is also integrally molded as a part of the button spring means. This member has a hole 58 to receive a fastening means for fastening the device to the case of the reel.

Figure 9:
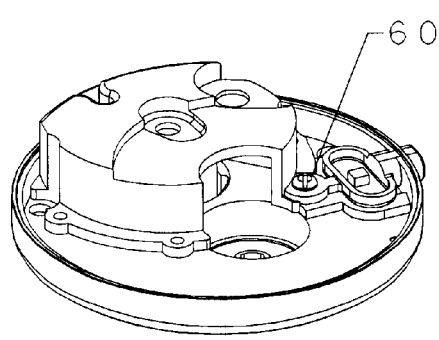
FIG. 9 shows a device of FIG. 5 positioned within the housing of the reel.
Figure 8:
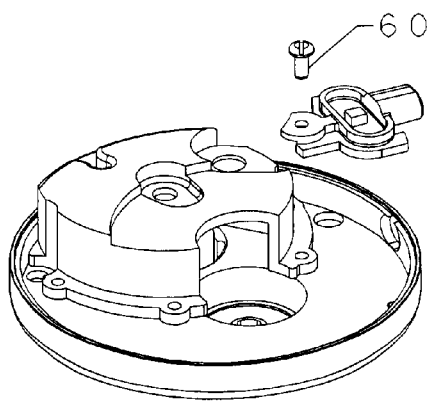
FIG. 8 is an exploded perspective view of the device shown in FIG. 5 in relation to a portion of a lever drag reel.

The housing 52 is formed so as to abut against the inner peripheral wall of the housing of the reel and stabilize the button, as shown clearly in the assembled condition, FIG. 9. Therein the screw 60 fastens the device to the housing through the hole 58.

In the position shown in FIG. 9, the button may be depressed so as to allow the lever to pass partially over the button and retain it in its depressed position as shown in FIG. 3.

The connection of the arm portions of the spring at 46 and 48 to the button are designed to hold the button in place, so it does not kip out of alignment and jam.

What is claimed is:

1. In a lever drag fishing reel having multiple drag positions, the improvement comprising a one-piece button spring assembly means for permitting a lever to advance from a first strike position to a second position, said one-piece button spring assembly means comprising a button joined in one piece with a spring and joined in one piece with a bracket fixedly mounted to the reel.

2. The one-piece button spring assembly means of claim 1 wherein the button is oblong.

3. The one-piece button spring assembly means of claim 1 wherein the spring is in the shape of an elliptical loop.

4. The one-piece button spring assembly means of claim 3 wherein the loop has a non-round cross-section.

5. The one-piece button spring assembly means of claim 3 wherein the loop is connected to the button at two points.

6. The lever drag fishing reel of claim 1 wherein a boss means is provided attached to said reel to limit movement of the spring, when it is being compressed.

* * * * *